United States Patent

Ambrogi et al.

[11] Patent Number: 5,499,499
[45] Date of Patent: Mar. 19, 1996

[54] CLADDED COMBUSTION CHAMBER CONSTRUCTION

[75] Inventors: Christine J. M. Ambrogi, Courcouronnes; Denis R. H. Ansart, Bois Le Roi; Eric J. S. Lancelot, Melun; Serge M. Meunier, Le Chatelet En Brie, all of France

[73] Assignee: Societe Nationale D'Etude et de Construction de Moteurs D'Aviation, Paris, France

[21] Appl. No.: 316,338

[22] Filed: Sep. 30, 1994

[30] Foreign Application Priority Data

Oct. 6, 1993 [FR] France .................. 93 11897

[51] Int. Cl.$^6$ .................................................. F23R 3/60
[52] U.S. Cl. .................. 60/39.32; 60/752; 60/754
[58] Field of Search .................. 60/752, 753, 39.31, 60/39.32, 754; 110/339, 340; 431/352

[56] References Cited

U.S. PATENT DOCUMENTS

| | | | |
|---|---|---|---|
| 2,544,538 | 3/1951 | Mahnken et al. | 60/752 |
| 3,016,703 | 1/1962 | Lorett et al. | 60/752 |
| 3,594,109 | 7/1971 | Penny | 60/753 |
| 3,880,575 | 4/1975 | Cross et al. | 60/753 |
| 4,480,436 | 11/1984 | Maclin . | |
| 4,567,730 | 2/1986 | Scott | 60/753 |
| 4,569,660 | 2/1986 | Bossetti | 110/339 |
| 4,614,082 | 9/1986 | Sterman et al. . | |
| 4,805,397 | 2/1989 | Barbier et al. . | |
| 4,907,411 | 3/1990 | Krueger | 60/753 |
| 5,079,915 | 1/1992 | Veau . | |
| 5,323,601 | 6/1994 | Jarrell et al. | 60/752 |
| 5,339,637 | 8/1994 | Schetter | 431/352 |
| 5,363,643 | 11/1994 | Halila | 60/752 |

FOREIGN PATENT DOCUMENTS

| | | |
|---|---|---|
| 0248731 | 9/1987 | European Pat. Off. . |
| 0387123 | 12/1990 | European Pat. Off. . |
| 2158572 | 6/1973 | France . |
| 2567250 | 1/1986 | France . |
| 3535442 | 4/1987 | Germany .................. 60/752 |
| 59131 | 5/1981 | Japan .................. 60/753 |
| 800831 | 9/1958 | United Kingdom .................. 110/339 |
| 2074308 | 10/1981 | United Kingdom .................. 60/752 |

*Primary Examiner*—Timothy S. Thorpe
*Attorney, Agent, or Firm*—Bacon & Thomas

[57] ABSTRACT

A cladded combustion chamber construction is disclosed in which the cladding tiles can be assembled and replaced without the necessity of disassembling the structural wall of the combustion chamber. The combustion chamber has a generally cylindrical wall with external and internal surfaces bounding the combustion chamber and has a plurality of cladding tiles located on one of the external and internal surfaces of the wall. To attach the cladding tiles to the combustion chamber structure, a plurality of channel shaped attaching devices are utilized extending in a generally circumferential direction around the wall of the combustion chamber and having a portion extending generally parallel to the wall, but spaced from the wall. The portion extending parallel to the wall of the combustion chamber has a circumferentially extending cut out portion whose circumferential length is slightly greater than the width of a cladding tile. The channel shaped attaching devices are spaced axially along the wall of the combustion chamber and are spaced apart a distance slightly greater than a length of a cladding tile. In order to attach the cladding tile to the combustion chamber wall, it is merely necessary to place one end of the tile in one of the channel members and to pass the other end of the tile through the circumferential cut out of the other attaching channel.

11 Claims, 3 Drawing Sheets

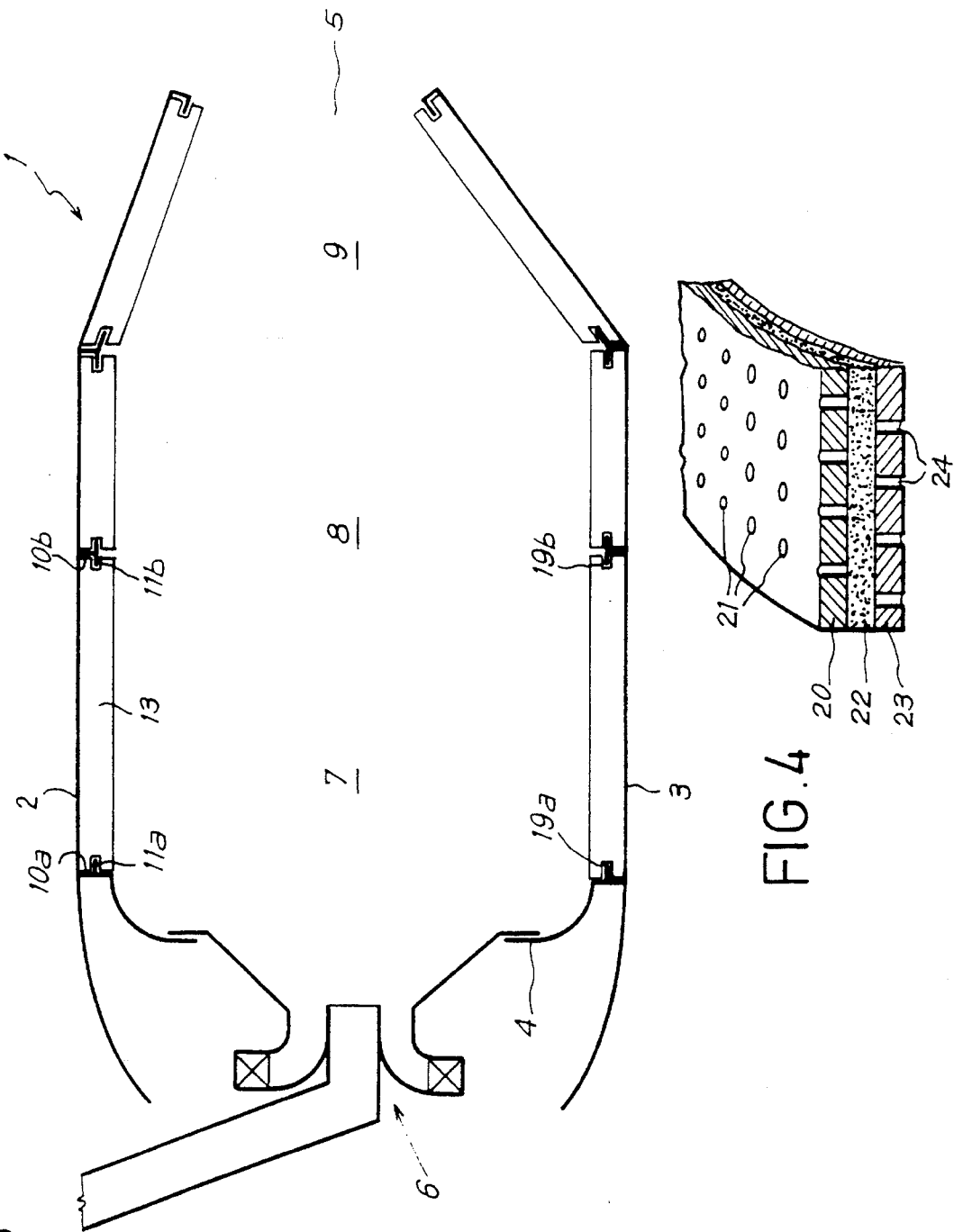

5,499,499

CLADDED COMBUSTION CHAMBER CONSTRUCTION

BACKGROUND OF THE INVENTION

The present invention relates to a combustion chamber for a turbojet engine, more particularly such a combustion chamber having a cladding of tiles on the wall defining the combustion chamber.

As is well known in the art, the efficiency of the gas turbine engine, such as an aircraft turbojet engine, increases as the temperature within the combustion chamber increases. However, such increased combustion chamber temperatures require means to protect the wall of the combustion chamber so as to maintain the structural integrity of the combustion chamber.

It is known to provide a layer of temperature resistant panels to the wall of a combustion chamber, as disclosed in U.S. Pat. No. 4,480,436. The structural walls comprise a plurality of circumferentially spaced segments which, following the positioning of the plurality of panels, are attached to one another. In order to replace one of the panels in a combustion chamber according to this construction, it is necessary to disassemble the spaced segments and to reassemble the segments following panel replacement. In addition, the segments are fitted on their axial edges with collars which permit the attachment of the segments to each other using fasteners, which construction adds weight to the combustion chamber structure.

SUMMARY OF THE INVENTION

A cladded combustion chamber construction is disclosed in which the cladding tiles can be assembled and replaced without the necessity of disassembling the structural wall of the combustion chamber. The combustion chamber has a generally cylindrical wall with external and internal surfaces bounding the combustion chamber and has a plurality of cladding tiles located on one of the external and internal surfaces of the wall. To attach the cladding tiles to the combustion chamber structure, a plurality of channel shaped attaching devices are utilized extending in a generally circumferential direction around the wall of the combustion chamber and having a portion extending generally parallel to the wall, but spaced from the wall. The portion extending parallel to the wall of the combustion chamber has a circumferentially extending cut out portion whose circumferential length is slightly greater than the width of a cladding tile. The channel shaped attaching devices are spaced axially along the wall of the combustion chamber and are spaced apart a distance slightly greater than a length of a cladding tile. In order to attach the cladding tile to the combustion chamber wall, it is merely necessary to place one end of the tile in one of the channel members and to pass the other end of the tile through the circumferential cut out of the other attaching channel. Following insertion of the cladding tile, the tile is moved in a circumferential direction such that it is out of alignment with the circumferential cut out to thereby affix it to the combustion chamber wall. This procedure is continued until the entire surface of the combustion chamber wall is covered by cladding tiles. Following insertion of the final cladding tile, the cladding tile layer is circumferentially displaced such that no single tile is in alignment with the circumferential cut out.

The layer of cladding tiles may be applied to either the external surface of the wall or the internal surface of the wall as is necessary for a specific combustion chamber design. In turbojet engines having an annular combustion chamber defined by inner and outer annular walls, the layer of cladding tiles may be applied to either the external surfaces, or the internal surfaces of both the inner and outer walls.

Front and rear edge portions of the tile may also define a groove configured to accommodate the portion of the attachment channel extending parallel to the combustion chamber wall. If the combustion chamber wall defines one or more air inlet orifices, the tiles may also define an opening which is aligned with the air inlet orifice and an air intake sleeve may be inserted through the opening and orifice to allow air to pass into the combustion chamber. As is known in the art, such a combustion chamber may define a primary combustion zone and a dilution zone, and the air intake orifices may be located so as to supply air to these zones.

The individual cladding tile may have three layers, external and internal layers fabricated from a perforated metallic material and a middle layer formed of porous metal material, such as stainless steel. The perforations of the inner and outer layers are located such that they are staggered or offset relative to each other in order to slow the flow of cooling air through the porous wall and to thereby achieve more beneficial heat exchange.

BRIEF DESCRIPTION OF THE DRAWINGS

FIG. 3 is a view similar to FIG. 2, but illustrating an alternative embodiment of the combustion chamber structure according to the invention.

FIG. 4 is partial, perspective view, partially broken away, illustrating the construction of a cladding tile according to the present invention.

DETAILED DESCRIPTION OF THE PREFERRED EMBODIMENTS

Figure 2:
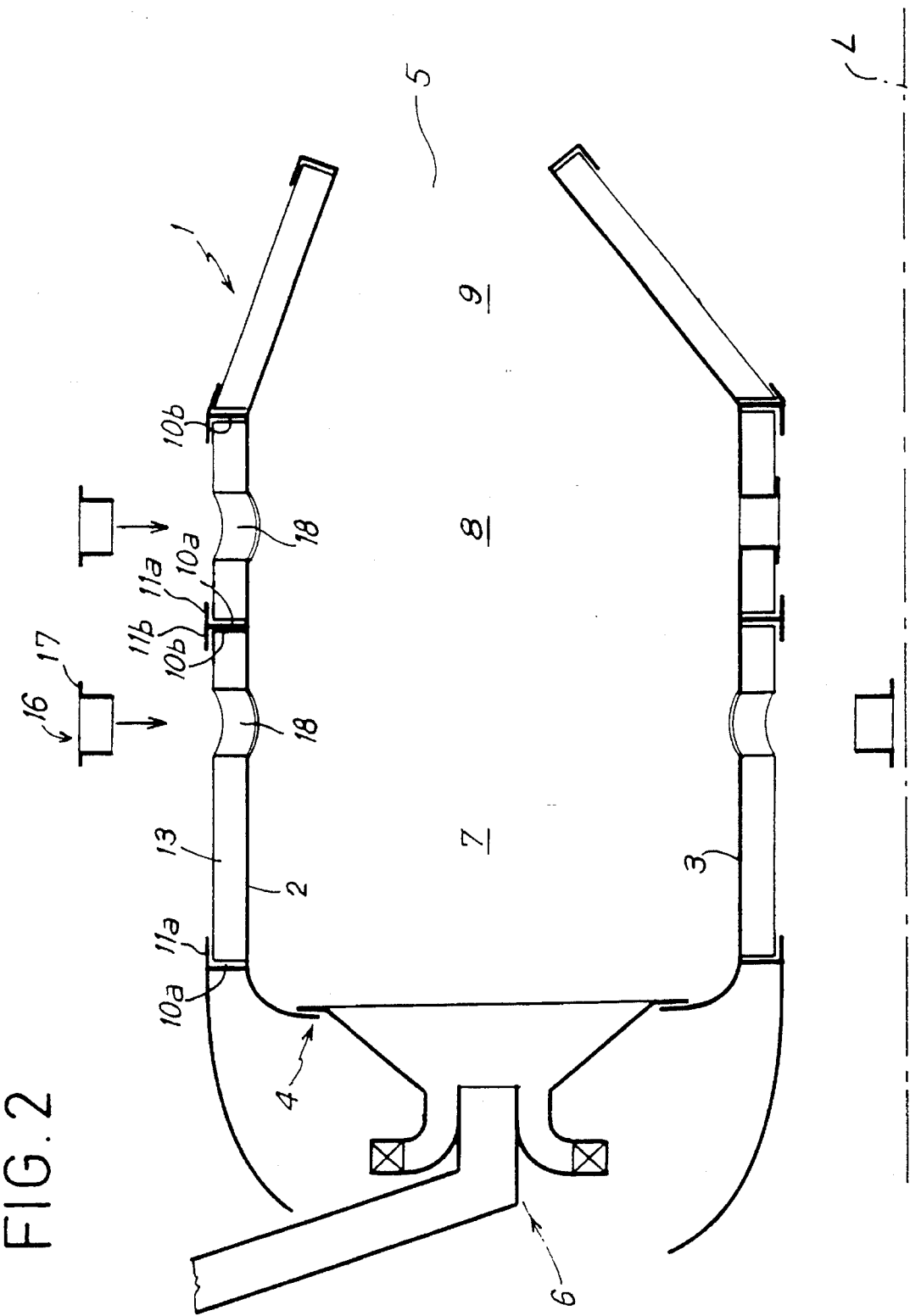
FIG. 2 is an axial cross-sectional view of a portion of a combustion chamber illustrating a first embodiment of the combustion chamber construction according to the present invention.

As best illustrated in FIGS. 2 and 3, the annular combustion chamber 1 is defined by outer wall 2 and inner wall 3, both of which are substantially annular in configuration and extend about a longitudinal axis L to bound the annular combustion chamber. The outer wall 2 and inner wall 3 are connected at their upstream ends by a chamber end wall 4 and bound an outlet 5 at their downstream ends for the exit of hot gases from the combustion chamber. In known fashion, the upstream chamber end 4 is fitted with a fuel injector 6 to inject fuel into the combustion chamber. The outer and inner walls 2 and 3 with the combustion chamber end 4 define an annular combustion chamber in which an upstream portion 7 constitutes a primary combustion zone, the central portion defines a dilution zone 8 and the downstream portion 9 defines outlet 5.

Each wall 2 and 3 is integrally joined with the combustion chamber end 4 such that they assure the rigidity of the combustion chamber. The outer wall 2 and inner wall 3 each have an external surface, facing away from the interior of the combustion chamber, and an internal surface, which faces inwardly into the combustion chamber. On either the external surface or the internal surface, the walls have a plurality of attaching channels comprising a first channel portion 10a and 10b each having thereon a second channel portion in the form of annular strips 11a and 11b, respectively, which extend generally parallel to the respective wall surface, but is spaced from the adjacent wall surface. The attachment channels engage first and second (upstream and downstream) edges of a cladding tile 13 to hold the cladding tiles in position on the combustion chamber wall.

Figure 1:
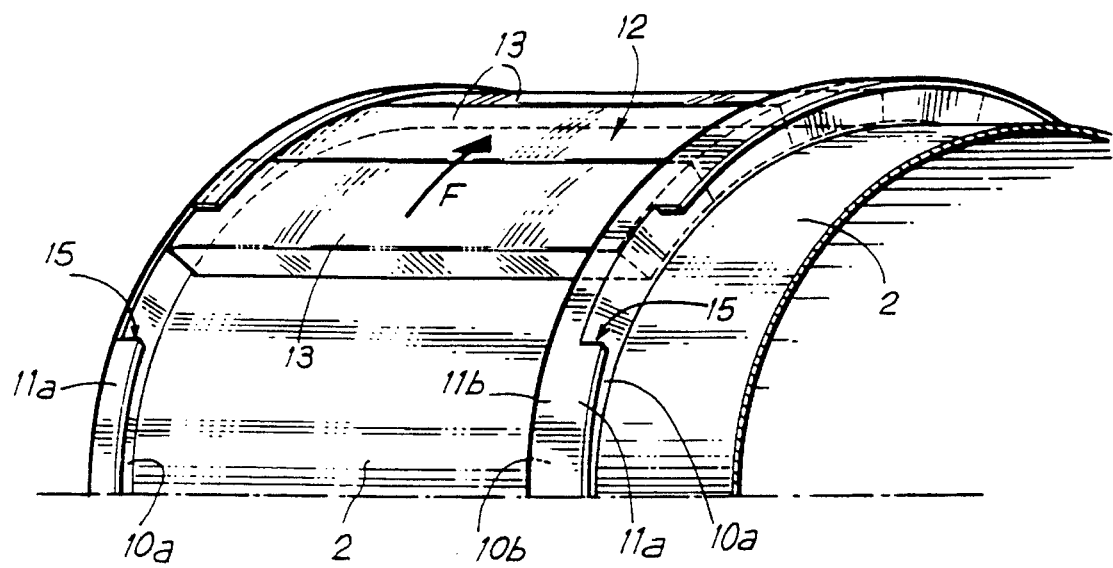
FIG. 1 is a partial, schematic view of a combustion chamber wall according to the present invention.

One of the annular strips 11a or 11b defines a circumferential cut out 15, the circumferential dimension of which is slightly wider than the width of a cladding tile. In order to apply the cladding tiles to the combustion chamber structure, it is merely necessary to consecutively insert the cladding tiles 13 through the cut out 15 after the opposite edge portion is inserted under an annular strip which does not define a cut out portion. After insertion, the tiles are moved in a circumferential direction, indicated by arrow F in FIG. 1, to permit the insertion of the next subsequent tile. Following insertion of the final tile through the cut out 15, the cladding tile layer 12 is rotated circumferentially relative to the wall surface such that no single tile is in alignment with the cut out portion 15, thereby preventing exits of the tile through the cut out portion 15. The cladding tiles may be affixed to either the external surface or the internal surface of the combustion chamber walls.

As illustrated in FIG. 2, the combustion chamber walls 2 and 3 may define air intake orifices to admit air to the primary zone 7 or the dilution zone 8 in known fashion. In such instances, the cladding tiles 13 define openings 18 which are located so as to be coincident with the intake orifices defined by the combustion chamber walls. Once in alignment, a sleeve 16 is inserted through the opening and the orifice. The sleeve may be retained in a position by either a forced fit in the opening 18 or by use of known fastening devices through collar 17.

In the embodiment illustrated in FIG. 3, the cladding tiles are located on the internal surfaces of the walls 2 and 3 inside the combustion chamber. In this embodiment, the front and rear edge portions of the cladding tiles 13 define channels 19a and 19b, respectively, configured to slidably receive the annular strips 11a and 11b. The insertion of the cladding tiles in this embodiment is exactly the same as described in regard to the previous embodiment. One of the annular strips 11a or 11b defines a circumferential cut out to enable one end of the cladding tile 13 to pass through the cut out, following which the cladding tile is circumferentially displaced such that strips 11a and 11b engage channels 19a and 19b, respectively.

The cladding tiles 13 are formed such that they have a large heat exchange area. For that purpose, the tiles may be comprised of three superposed components, specifically, inner and outer layers 20 and 23, each having a plurality of perforations 21 and 24, respectively. An intermediate layer 22 is formed from a porous metallic material which may be a stainless steel alloy such as Hastelloy X. The intermediate layer 22 may be formed by powder metallurgy techniques, by means of a metal foam, by an aggregation of balls, or by any other known method which enables the porosity of the layer to be controlled.

The perforations 21 and 24 of the outer layer 20 and the inner layer 23, respectively, are staggered relative to each other in order to slow the cooling flow through the porous wall 22 and to thereby improve the heat exchange characteristics of the cladding tiles. The layers 20, 22, and 23 may be connected to each other such as by brazing their ends together. Alternatively, the layers may be utilized without being physically attached to one another.

The foregoing description is provided for illustrative purposes only and should not be construed as in any way limiting this invention, the scope of which is defined solely by the appended claims.

We claim:

1. A cladded combustion chamber for a turbojet engine, the chamber having a longitudinal axis with a generally cylindrical wall extending about the longitudinal axis, with an external surface and an internal surface bounding the combustion chamber, comprising:
   a) a plurality of cladding tiles each having a length extending in the direction of the longitudinal axis; a width extending transversely thereto and a thickness extending in a radical direction, the tiles being located on one of the external and internal surfaces of the wall; and
   b) attachment means to attach the plurality of cladding tiles to the wall, the attachment means comprising:
      i) a plurality of first members axially spaced apart long the longitudinal axis attached to and extending from the wall in a generally radial direction with respect to the longitudinal axis;
      ii) a second member in the configuration of an annular strip extending generally transversely from each of the first members in a direction generally parallel to the surfaces of the wall and spaced from the adjacent wall a distance greater than the thickness of the tiles; and
      iii) a circumferentially extending cut out defined by one of the second members, the cut out having a dimension in the circumferential direction greater than widths of the cladding tiles, such that a portion of the cladding tiles can be passed through the cut out and the cladding tiles retained against the wall by the second member after being moved in a circumferential direction out of alignment with the cut out.

2. The cladded combustion chamber of claim 1 wherein the first members extend from the external surface of the wall and the cladding tiles are retained against the external surface.

3. The cladded combustion chamber of claim 1 wherein the first members extend from the internal surface of the wall and the cladding tiles are retained against the internal surface.

4. The cladded combustion chamber of claim 1 wherein the combustion chamber has a substantially annular configuration bounded by an outer wall and an inner wall, each wall having an external surface and an internal surface facing into the combustion chamber, and further comprising a plurality of cladding tiles located on one of the external and internal surfaces of both the inner and outer walls.

5. The cladded combustion chamber of claim 4 wherein the first members extend from and the cladding tiles are located on the external surfaces of both the inner and outer walls.

6. The cladded combustion chamber of claim 4 wherein the first members extend from and the cladding tiles are located on the internal surfaces of both the inner and outer walls.

7. The cladded combustion chamber of claim 1 wherein the wall defines at least one air intake orifice and further comprising:
   a) an opening defined by at least one cladding tile located so as to be substantially coincident with the at least one air intake orifice; and
   b) an air intake sleeve extending into the opening and the at least one air intake orifice.

8. The cladded combustion chamber of claim 1 wherein each cladding tile has opposite edge portions extending generally transverse to the longitudinal axis and further comprising a channel defined by each opposite edge portion configured to slidably engage the second member.

9. The cladded combustion chamber of claim 1 wherein each cladding tile comprises:
   a) an outer layer of metallic material defining a first plurality of perforations;
   b) an inner layer of metallic material defining a second plurality of perforations; and
   c) an intermediate layer of porous metallic material located between the inner and outer layers.

10. The cladded combustion chamber of claim 9 wherein the intermediate layer is stainless steel.

11. The cladded combustion chamber of claim 9 wherein the first plurality of perforations are out of alignment with the second plurality of perforations.

* * * * *